(12) United States Patent
Mannherz et al.

(10) Patent No.: US 11,198,416 B2
(45) Date of Patent: Dec. 14, 2021

(54) METHOD AND DEVICE FOR OPERATING AN AUTOMATED LOCKING BRAKE

(71) Applicant: Robert Bosch GmbH, Stuttgart (DE)

(72) Inventors: Edith Mannherz, Weinberg (DE); Philipp Schmaelzle, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 16/255,029

(22) Filed: Jan. 23, 2019

(65) Prior Publication Data

US 2019/0232930 A1 Aug. 1, 2019

(30) Foreign Application Priority Data

Jan. 30, 2018 (DE) ...................... 10 2018 201 384.5

(51) Int. Cl.
| | |
|---|---|
| *B60T 7/12* | (2006.01) |
| *F16D 65/18* | (2006.01) |
| *F16D 55/224* | (2006.01) |
| *B60T 8/17* | (2006.01) |
| *B60T 13/74* | (2006.01) |
| *B60T 8/32* | (2006.01) |
| *F16D 121/24* | (2012.01) |

(52) U.S. Cl.
CPC ............... *B60T 7/12* (2013.01); *B60T 8/17* (2013.01); *B60T 8/321* (2013.01); *B60T 13/741* (2013.01); *B60T 13/745* (2013.01); *F16D 55/224* (2013.01); *F16D 65/183* (2013.01); *B60T 2270/89* (2013.01); *F16D 2121/24* (2013.01)

(58) Field of Classification Search
None
See application file for complete search history.

(56) References Cited

U.S. PATENT DOCUMENTS

| | | | | |
|---|---|---|---|---|
| 6,227,626 | B1 * | 5/2001 | Blattert | B60T 13/741 |
| | | | | 303/20 |
| 8,938,346 | B2 * | 1/2015 | Oliveira | B60T 7/12 |
| | | | | 701/70 |
| 9,132,819 | B2 * | 9/2015 | Furuyama | B60T 8/00 |
| 10,300,894 | B2 * | 5/2019 | Rawashdeh | G06K 9/4652 |
| 10,479,334 | B2 * | 11/2019 | Hill | B60T 7/20 |
| 10,501,062 | B2 * | 12/2019 | Wulf | B60T 8/94 |
| 2012/0161508 | A1 * | 6/2012 | Beever | B60T 17/18 |
| | | | | 303/191 |
| 2013/0116904 | A1 * | 5/2013 | Watanabe | B60T 13/741 |
| | | | | 701/70 |
| 2013/0192937 | A1 * | 8/2013 | Furuyama | B60T 13/66 |
| | | | | 188/72.6 |
| 2013/0226425 | A1 * | 8/2013 | Oliveira | B60T 7/122 |
| | | | | 701/70 |

(Continued)

FOREIGN PATENT DOCUMENTS

DE 10 2015 226 838 A1 7/2017

*Primary Examiner* — Dale W Hilgendorf
*Assistant Examiner* — Alexander C. Bost
(74) *Attorney, Agent, or Firm* — Maginot, Moore & Beck LLP

(57) ABSTRACT

A method for operating an automated locking brake in a motor vehicle includes setting a defined deceleration of the vehicle with the locking brake during a locking brake process, shutting-off activation of the locking brake when a shut-off condition has been satisfied, and taking into account at least one predicted value of the locking brake process in the shut-off condition.

9 Claims, 4 Drawing Sheets

(56) References Cited

U.S. PATENT DOCUMENTS

| | | | |
|---|---|---|---|
| 2013/0275019 A1* | 10/2013 | Murata | B60T 7/22 |
| | | | 701/70 |
| 2014/0015310 A1* | 1/2014 | Hanzawa | B60T 17/22 |
| | | | 303/3 |
| 2017/0345249 A1* | 11/2017 | Beever | B60T 17/18 |
| 2017/0361816 A1* | 12/2017 | Besier | B60T 8/1761 |
| 2018/0072292 A1* | 3/2018 | Renaud | B60T 7/042 |
| 2018/0257615 A1* | 9/2018 | Rawashdeh | B60T 7/12 |
| 2018/0339685 A1* | 11/2018 | Hill | B60T 8/176 |
| 2019/0168722 A1* | 6/2019 | Schroeder | B60T 7/22 |
| 2019/0248349 A1* | 8/2019 | Wulf | B60W 10/188 |

* cited by examiner

METHOD AND DEVICE FOR OPERATING AN AUTOMATED LOCKING BRAKE

This application claims priority under 35 U.S.C. § 119 to patent application no. DE 10 2018 201 384.5, filed on Jan. 30, 2018 in Germany, the disclosure of which is incorporated herein by reference in its entirety.

The disclosure relates to a method for operating an automated locking brake in a motor vehicle, wherein a defined deceleration of the vehicle is set by means of the locking brake, wherein the method is characterized in that a shut-off of the activation of the locking brake occurs when a shut-off condition has been satisfied, wherein at least one predicted value of the locking brake process is taken into account in the shut-off condition. Furthermore, a device for carrying out the method is provided.

BACKGROUND

Locking and/or parking brakes in vehicles are known that are configured as an electromechanical braking mechanism with an electrical braking motor, which displaces a brake piston toward a brake disk in order to secure the vehicle at a standstill. A locking brake such as this is known from DE 10 2015 226 838 A1, for example.

Currently existing vehicle systems, which use an electromechanical auxiliary braking mechanism, hereinafter referred to as APB or locking brake, in the fallback level of a complete or partial failure of the primary braking system, mostly have a simple control for adjusting the emergency braking.

This means that the actuation of the secondary braking system depends only upon the currently presumed braking force or the measured motor current. The activation ends when the target value is achieved. In order to ensure the stability of the vehicle, the maximum force level can be activated in stages, for example, or other strategies e.g. wheel slip-controlled strategies (cf ABS) can be used. In this way, the driver should be given the opportunity to adapt to the vehicle behavior and to discontinue the build-up of clamping force in a timely manner. The aforementioned force or motor current stages are stored in characteristic diagrams or characteristic curves in the software and cannot be adapted. An adaptation to modified framework conditions occurs only in wheel slip-controlled strategies; for example, increased vehicle load or reduced brake lining coefficient of friction. The quality of the control is directly dependent upon the quality of the measurements of motor current and motor voltage and any downstream force determination algorithms.

A problem with the current systems is their low level of precision in the activation and their difficulties in adapting to modified framework and environmental conditions. The existing systems all aim for an APB system-internal value. Hereafter, the motor current of the servomotor will be used for this purpose. Upon recognizing a brake request by the driver and a detected failure/partial failure of the primary braking system, the APB is activated for emergency braking. The motor current is measured with appropriate tolerances, and the actuation is maintained until the target specification, e.g. 5 A, is achieved. As a result of the control, the expected vehicle deceleration is achieved only with the same boundary conditions as in function applications, or two counteracting factors cancel each other out, such as, for example, a higher load with a higher brake lining coefficient of friction. If the load state, the coefficient of friction of the brake lining or the APB system friction as a result of aging, the temperature, etc. changes, then the vehicle deceleration is different with the same motor current. Systems that use a superordinate control variable, such as an estimated clamping force, can compensate for several influencing factors within the APB system. External factors, such as the load state, are not taken into account.

SUMMARY

By contrast, the method according to the disclosure advantageously makes it possible to compensate for many of the external influencing factors on the vehicle deceleration by dynamically calculating the shut-off time and, in this way, to always set the expected vehicle deceleration, to the extent that this is physically possible.

According to the disclosure, this is made possible by the features disclosed in the independent claims. Further configurations of the disclosure are the subject matter of the sub-claims.

The method according to the disclosure for operating an automated locking brake in a motor vehicle, wherein a defined deceleration of the vehicle is set by means of the locking brake, is characterized in that a shut-off of the activation of the locking brake occurs when a shut-off condition has been satisfied, wherein at least one predicted value of the locking brake process is taken into account in the shut-off condition.

A shut-off of the activation is understood in this instance to mean a deactivation of the activation. That is to say, the supply of current to the locking brake is ended, for example. However, since a locking brake is usually configured to be self-inhibiting, this is not understood to be a deactivation of the (clamping force of the) locking brake—which does not occur until the locking brake is released. Taking a predicted value into account is understood to mean that the future development of the locking brake process is anticipated and a corresponding "future value" is considered. A future value of a parameter can be estimated for this purpose. For example, the future progression of an already existing and calculable parameter is predicted, or a defined future value of said parameter is calculated. Alternatively, a value of a future-oriented parameter can also be estimated. Thus a shut-off occurs not on the basis of a calculated current value of a parameter, for example, but rather on the basis of an estimated future value. An appropriate shut-off point is thus determined by taking into account the estimates regarding at least one future-oriented parameter and/or indicator.

Advantageously, a more precise and repeatable setting of a vehicle deceleration by means of an electromechanical auxiliary braking mechanism is thereby permitted. In this way, further possibilities arise for the use of APB for dynamic braking maneuvers. The fallback level of the primary braking system can be expanded and configured more freely, and the availability of the braking system can thus be increased. The essence of the disclosure is the calculation of the correct shut-off point. By means of the dynamic calculation of the shut-off point, it is possible to compensate for many of the external influencing factors on the vehicle deceleration. The prescribed deceleration of the vehicle is achieved here with the one-time application of the locking brake. The system does not control to a prescribed control variable.

In one advantageous embodiment, the method is characterized in that a remaining time of the locking brake process is taken into account in the shut-off condition.

This is understood to mean that the remaining time of the locking brake process is taken into account as a predicted value. The remaining time is understood to be the period of time that is required to fulfill a specific state or condition of the locking brake process proceeding from the current point in time. In particular, this can be achieving a defined deceleration of the vehicle. In an alternative embodiment, however, the state of the vehicle can also be a standstill, for example—in this sense, the remaining time would be understood to be the remaining time required to brake the vehicle to a velocity of zero (this could advantageously be implemented in particular in connection with a pulse width modulation and/or an intermediate shut-off of the activation). To calculate the expected time remaining in the locking brake process until a defined deceleration is achieved, a required target deceleration and, for example, a change in deceleration can be taken into account in addition to the current actual deceleration. Advantageously, a shut-off point for the activation of the locking brake can thereby be determined on the basis of the expected time until a particular deceleration or acceleration is achieved.

In one possible embodiment, the method is characterized in that the determination of the remaining time of the locking brake process is made in consideration of an acceleration of the vehicle.

This is understood to mean that acceleration values are taken into account in order to calculate the time remaining. Naturally, acceleration is understood to include both positive and negative acceleration (i.e. deceleration). For example, the current deceleration of the vehicle can be taken into account. This can be determined by means of an existing wheel speed sensor system, for example. By including the currently available wheel deceleration curve, factors that influence it are (indirectly) considered. Doing so results in a more precise calculation of the shut-off point, which leads to a more precise setting of the desired deceleration.

In one preferred embodiment, the method is characterized in that the determination of the remaining time of the locking brake process is made in consideration of an actual deceleration of the vehicle and a target deceleration of the vehicle.

This is understood to mean that, in addition to the actual deceleration, a calculated target deceleration can be taken into account. In this way, the future development of the deceleration can be estimated.

In an alternative development, the method is characterized in that the determination of the remaining time in the locking brake process is made in consideration of the progress over time of the deceleration of the vehicle.

As was already explained, the future development of the current deceleration (actual deceleration) can be estimated by taking into account a target value for the deceleration (target deceleration). However, other approaches for determining and considering the progress over time of the deceleration also exist: for example, deriving the actual deceleration with respect to time, i.e. da/dt. In so doing, it is possible, for instance, to generate information that further refines the estimate of the remaining time.

In one advantageous embodiment, the method is characterized in that the determination of the remaining time of the locking brake process is made in consideration of a change in the deceleration of the vehicle.

By a dynamic calculation of the time remaining, a very precise determination of the ideal shut-off point can be made in order to set the desired deceleration with a high degree of precision and by means of a single application. For this purpose the progress over time or a change in the progress over time of the deceleration can also advantageously be determined and considered.

In one possible configuration, the method is characterized in that an overtravel time of the locking brake process is taken into account in the shut-off condition.

This is understood to mean that the overtravel time of the locking brake process is taken into account as a predicted value. Overtravel time is understood to be the period of time during which the locking brake continues to function and continues to build up clamping force and deceleration despite the shut-off of the activation. The overtravel in the locking brake occurs, for example, as a result of mass inertia or the dissipation of electrical energy. By determining and taking into account the overtravel time in the definition of the shut-off point of the activation of the locking brake, the setting of the deceleration of the vehicle that is to be achieved can be further optimized so that the desired deceleration can be set with a single application.

In a preferred development, the method is characterized in that at least one of the following values is taken into account in the determination of the overtravel time of the locking brake process:
  current angular velocity,
  current clamping distance,
  current clamping force.

This is understood to mean that one or more values are taken into account in order to calculate the overtravel time. For example, the future overtravel time can be determined on the basis of currently calculated values. In other words, it is possible to calculate the period of time that will elapse from the point of determining the stated values, until no further clamping force is built up if the activation of the locking brake were to be shut off at the point in time when the stated value was determined. The stated values can be determined in a simple way. A determination can take place, for example, directly by means of sensors or by means of an estimate using further values. For instance, the clamping force is estimated using the current and the voltage of the locking brake actuator.

In one preferred embodiment, the method according to one of the preceding claims is characterized in that a comparison between the overtravel time and the remaining time of the locking brake process is taken into consideration in the shut-off condition, wherein the shut-off of the activation of the locking brake occurs in particular when the overtravel time and the remaining time are equal.

This should be understood to mean that both the calculated overtravel time of the locking brake process and the calculated remaining time of the locking brake process are analyzed in the shut-off condition. Especially advantageously, a shut-off occurs precisely when the expected overtravel time corresponds to the calculated remaining time in the locking brake process. The specified deceleration value can hereby be set with a high level of quality and by means of a single application of the locking brake. A single application should be understood to mean that the target value can be set directly by means of one activation—in particular compared to the setting of a target value by means of an incremental "cautious approach".

According to the disclosure, a device is further provided for operating an automated locking brake, wherein said device is configured to carry out the method according to one of the method steps described above under normal conditions of use.

This is understood to mean that the device is designed, i.e. configured, and/or comprises means to carry out a method as described above under normal conditions of use. A control unit and/or a memory element and/or an operating element can be considered as devices of this type. For example, an ESP control device or APB control device is provided, which carries out a control of a locking brake. In particular, a control unit is provided that is designed and configured to activate a plurality of available automated parking brakes of a vehicle independently of each other. Moreover, a device can also be understood to be an image sensor and/or a video system. By using devices such as these, it is possible to implement the advantages already described within the scope of the method.

A device can thus also understood to be an electrical device that processes sensor signals and emits control and/or data signals as a function thereof. The device can include an interface, which can be configured by means of hardware or software. In a hardware-based configuration, the interfaces can be part of a so-called system ASIC, for example, which contains a wide variety of functions of the device. It is also possible, however, that the interfaces are their own integrated circuits or consist at least in part of discrete components. In a software-based configuration, the interfaces can be software modules that are present on a microcontroller, for example, alongside other software modules. The problem addressed by the disclosure can also be solved efficiently and cost-effectively by this design variant of the disclosure in the form of a device.

In addition, an automated locking brake is provided, which is configured to carry out the method according to one of the method steps described above under normal conditions of use.

Advantageously, a computer program is also provided, which is designed to carry out the described method when the computer program product is run on a device, as well as a machine-readable memory medium on which the computer program is stored. This is understood to mean that the computer program contains a program code for carrying out one or more or all of the aforementioned method steps when the computer program is run on a computer. Advantageous here is thus also a computer program product with program code that can be stored on a machine-readable carrier, such as a semiconductor memory, hard drive memory or an optical storage device, and is used to carry out the method according to one of the embodiments described above when the program product is run on a computer or a device. In this regard, the approach presented here produces a computer program product with program code for carrying out the method according to one of the variants disclosed here when the program product is run on a device.

It should be pointed out that the features disclosed individually in the description can be combined with one another in any technically sensible way and demonstrate further configurations of the disclosure. Further features and the practicality of the disclosure arise from the description of exemplary embodiments on the basis of the attached figures.

DETAILED DESCRIPTION

Figure 1:
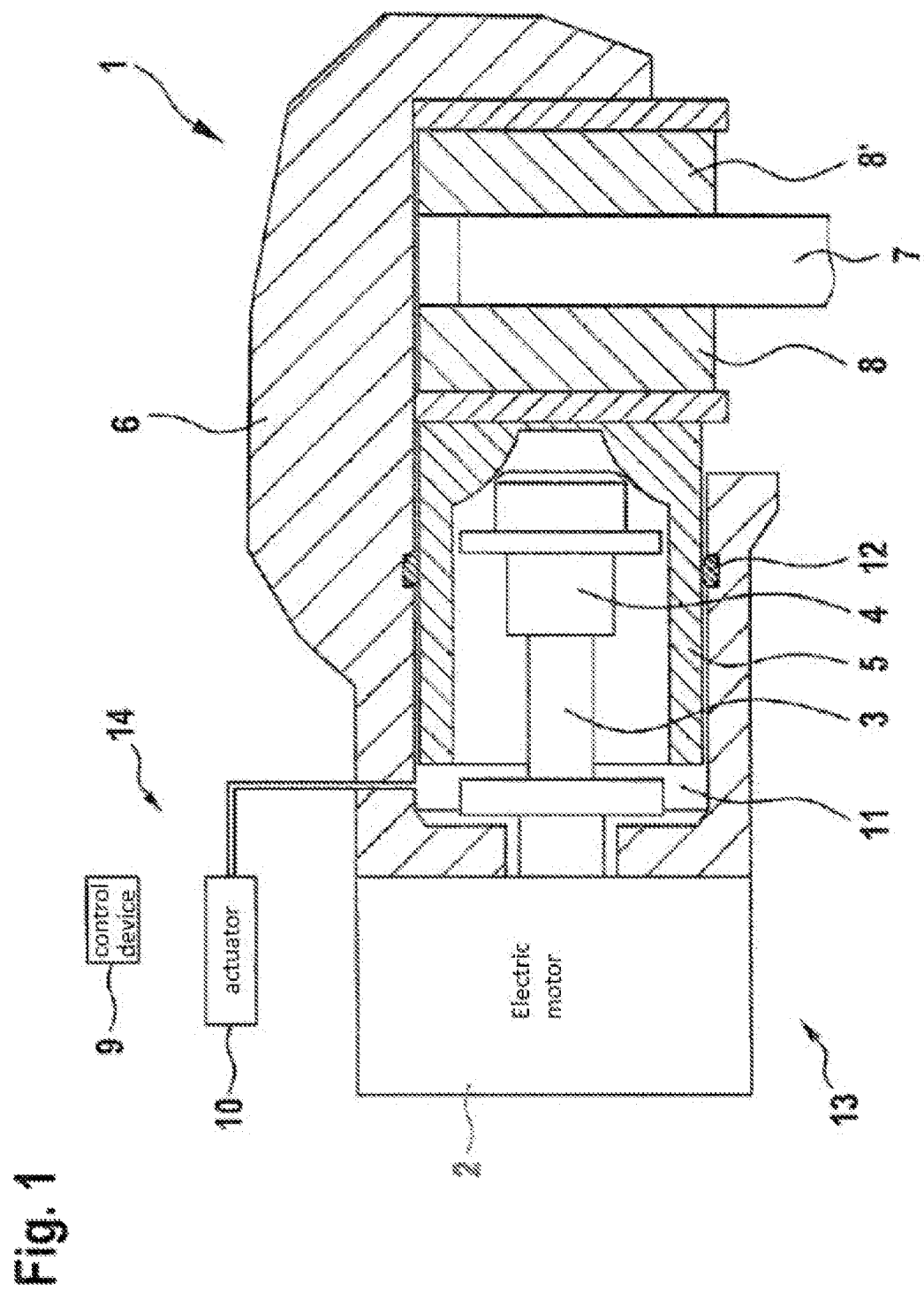
FIG. 1 a sectional view of a braking mechanism with an automatic locking brake in a "motor on caliper" design.

FIG. 1 shows a schematic sectional view of a braking mechanism 1 for a vehicle. The braking mechanism 1 has an automated locking brake 13 (also called an automatic locking brake or automated parking brake; abbreviated APB), which can exert a clamping force by means of an electromechanical actuator 2 (electric motor) in order to stop the vehicle. For this purpose, the electromechanical actuator 2 of the locking brake 13 shown drives a spindle 3, in particular a threaded spindle 3, that is mounted in an axial direction. At its end facing away from the actuator 2, the spindle 3 is provided with a spindle nut 4, which abuts the brake piston 5 when the automated locking brake 13 is in the engaged state. In this way, the locking brake 13 transmits a force to the brake linings 8, 8' and/or to the brake disk 7. The spindle nut in this instance is located against an inner front face of the brake piston 5 (also called the rear side of the brake piston head or inner piston crown). The spindle nut 4 is displaced in the axial direction when there is a rotary motion of the actuator 2 and a resulting rotary motion of the spindle 3. The spindle nut 4 and the brake piston 5 are mounted in a caliper 6, which engages over a brake disk 7 in a tong-like manner.

A brake lining 8, 8' is arranged on each of the two sides of the brake disk 7. In the case of an engagement process of the braking mechanism 1 by means of the automated locking brake 13, the electric motor (actuator 2) rotates, whereupon the spindle nut 4 and the brake piston 5 are moved toward the brake disk 7 in the axial direction in order to generate a predetermined clamping force between the brake linings 8, 8' and the brake disk 7. Owing to the spindle drive and the associated self-inhibition, a force generated by the locking brake 13 by means of an activation of the electric motor is also maintained when the activation is ended.

The automated locking brake 13 is configured, for example, as a "motor on caliper" system and is combined with the service brake 14. The locking brake 13 could also be considered to be integrated into the system of the service brake 14. Both the automated locking brake 13 and the service brake 14 access the same brake piston 5 and the same caliper 6 in order to build up a braking force on the brake disk 7. However, the service brake 14 has a separate hydraulic actuator 10, such as a brake pedal with a brake booster. In FIG. 1, the service brake 14 is configured as a hydraulic system, wherein the hydraulic actuator 10 can be supported or implemented by the ESP pump or an electromechanical brake booster (e.g. Bosch iBooster). Further embodiments of the actuator 10 are also conceivable, such as in the form of a so-called IPB (integrated power brake), which in principle represents a brake-by-wire system in which a plunger is used to build up hydraulic pressure. In the case of service braking, a predetermined clamping force between the brake linings 8, 8' and the brake disk 7 is built up hydraulically. For establishing a braking force by means of the hydraulic service brake 14, a medium 11, in particular a substantially incompressible brake fluid 11, is pressed into a fluid chamber that is delimited by the brake piston 5 and the caliper 6. The brake piston 5 is sealed off from the environment by means of a piston seal ring 12.

The activation of the brake actuators 2 and 10 is carried out by one or more end stages, i.e. by means of a control device 9, which can be, for instance, a control device of a driving dynamics system, such as ESP (electronic stability program) or another control device.

When the automated locking brake 13 is activated, the idle path and/or the air gap must first be overcome before a braking force can be built up. The idle path designates, for example, the distance the spindle nut 4 must overcome through the rotation of the spindle 3 in order to make contact with the brake piston 5. The air gap designates the distance between the brake linings 8, 8' and the brake disk 7 in brake disk systems of motor vehicles. In particular, overcoming the idle path usually takes a relatively long time in relation to the activation as a whole, in particular in the automated locking brake 13. At the end of a preparation phase such as this, the brake linings 8, 8' are applied against the brake disk 7, and the build-up of force begins with a further activation. FIG. 1 shows the state in which the idle path and air gap have already been overcome. Here, the brake linings 8, 8' are applied to the brake disk 7, and all brakes, i.e. the locking brake 13 and the service brake 14, can immediately build up a braking force on the corresponding wheel with a subsequent activation.

Figure 2:
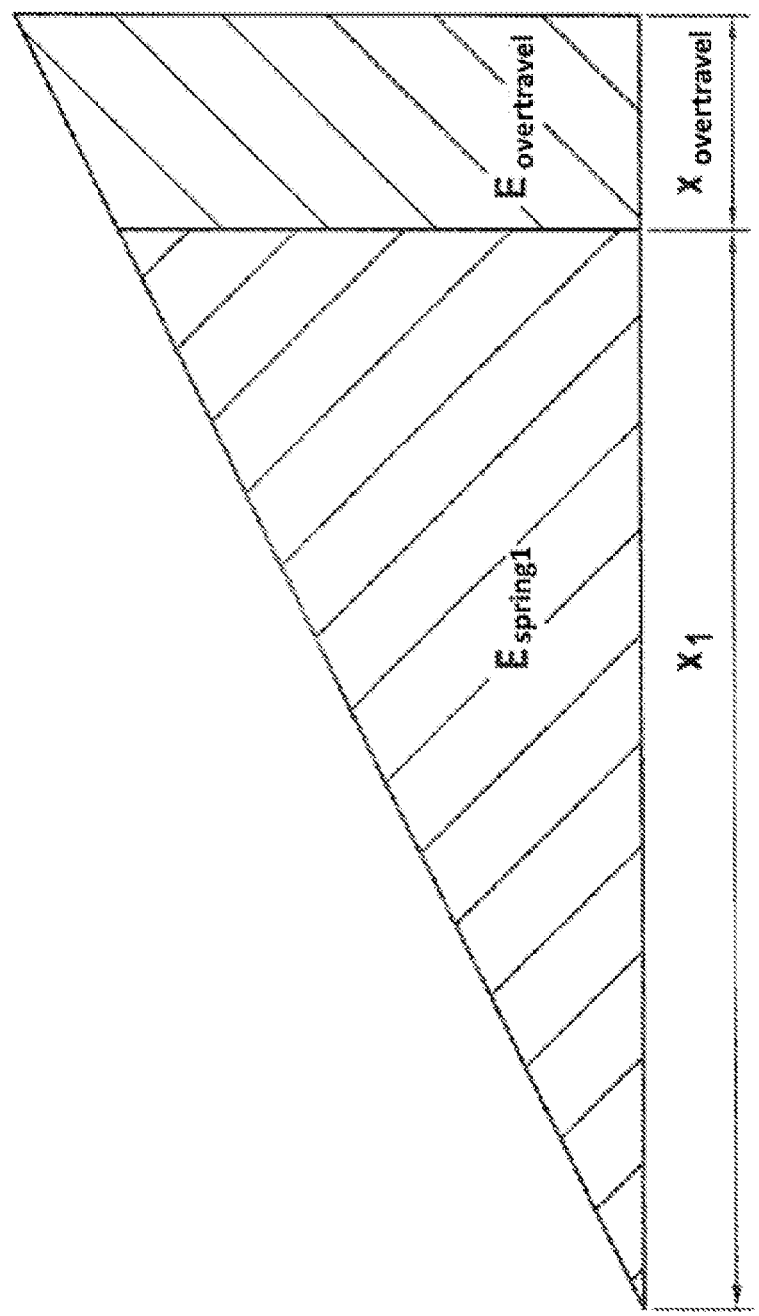
FIG. 2 a representation for estimating energy on a model of a linear spring.

FIG. 2 shows a representation for estimating energy on a model of a linear spring. $x_1$ is the clamping distance at the time of the shut-off. Accordingly, $E_{feder1}$ is the energy that has been introduced into the brake caliper to build up force until shut-off. Since the APB system reacts slowly to control actions, dominated by mass inertia, it is not possible to deactivate the APB activation with immediate effect upon reaching the target deceleration. The system continues to function, i.e. clamping force and deceleration are still built up. This is shown by the overtravel distance $x_{nachlauf}$. The energy that continues to be introduced during the overtravel is represented in the diagram as $E_{nachlauf}$. Therefore, the activation has to be concluded before reaching the target deceleration. This point in time must be calculated. FIG. 2 illustrates the approach on the basis of an approximation via the energies of a linear spring.

Figure 3:
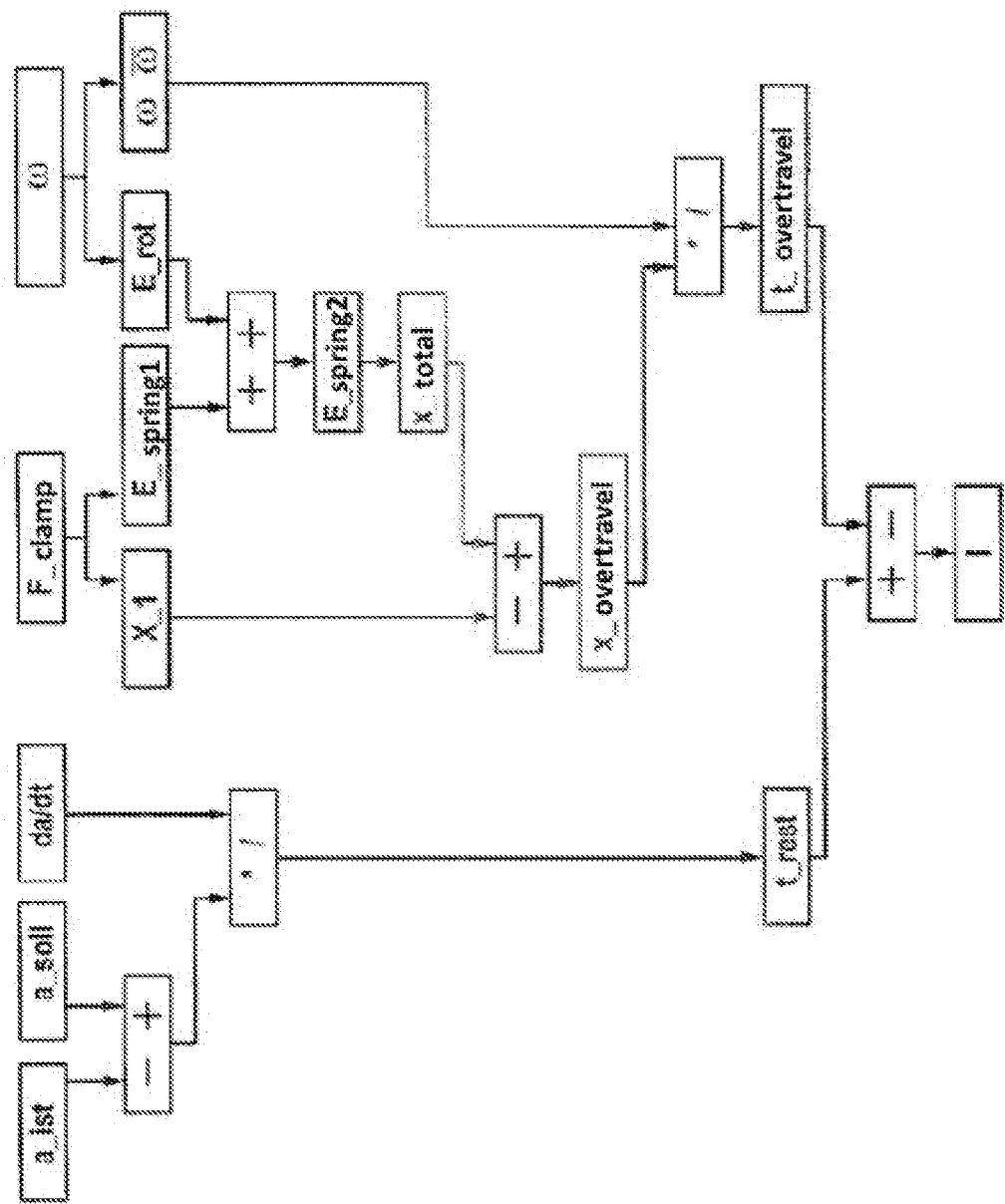
FIG. 3 an exemplary representation of a calculation process for determining the motor actuating signal.

FIG. 3 shows an exemplary representation of a calculation process for determining the motor actuating signal. In so doing, it is determined when the APD activation must be ended so that the prescribed deceleration is achieved by a single application. The activation of the locking brake is then ended (actuating signal I for deactivation) when the shut-off condition has been satisfied. That is to say, in this embodiment, when the determined overtravel time $t_{nachlauf}$ is equal to the determined remaining time t of the locking brake process. Once the condition (1-1) has been satisfied, the motor of the locking brake is deactivated:

$$t_{nachlauf} = t_{rest} \quad (1\text{-}1)$$

$t_{nachlauf}$ is the time during which the ARB continues to build up clamping force and thus deceleration after deactivation of the motor as a result of mass inertia. $t_{rest}$ describes the time that would be required to achieve the target deceleration value at the current wheel deceleration and jerk da/dt. The overtravel time $t_{nachlauf}$ is determined with the aid of the law of conservation of energy.

$$E_{rot} + E_{trans} - E_{verlust} = E_{brems} + E_{klemm} \quad (1\text{-}2)$$

In this instance, $E_{rot}$ describes the rotational energy of the motor gear unit, $E_{trans}$ the translational energy of the piston and brake lining, $E_{brems}$ the electrical energy that is dissipated in the H bridge by active braking, $E_{klemm}$ describes the energy that is required for clamping the brake caliper, i.e. for clamping force build-up, and $E_{verlust}$ the friction loss energy. For a simplified approach, it was assumed that $E_{rot} \gg E_{trans}$ and $E_{klemm} \gg E_{brems}$, whereby the equation was simplified to $$E_{rot} \approx E_{klemm} \quad (1\text{-}3)$$

The loss energy $E_{verlust}$ is hereafter expressed by means of the efficiency $\eta_{MoC}$ of the motor gear unit. The calculation of the overtravel time is carried out with the following equations.

$$E_{rot} = \tfrac{1}{2} \cdot J \cdot \omega^2$$

$$E_{nachlauf} = E_{rot} \cdot \eta_{MoC}$$

$$E_{feder1} = \tfrac{1}{2} \cdot k \cdot x_1^2$$

$$E_{feder2} = E_{feder1} + E_{nachlauf}$$

$$x_{nachlauf} = (2 \cdot E_{feder2}/k)^{1/2} - x_1$$

$$t_{nachlauf} = (x_{nachlauf} \cdot 2\pi \cdot i_G)/(\omega^- \cdot i_s) \quad (1\text{-}4)$$

In this case, $E_{feder1}$ is the energy that has been introduced into the caliper for force build-up until shut-off. $E_{feder2}$ is the energy that was introduced into the caliper with the motor at a standstill. $x_1$ is the clamping distance at the point of shut-off, k is the caliper rigidity, which is assumed to be linear, $i_G$ is the gear transmission ratio, $i_s$ is the incline of the threaded spindle and $\omega^-$ is a mean shut-off angular velocity. The mean shut-off angular velocity $\omega^-$ can be calculated from the angular velocity $\omega$ at the shut-off point, for example, by linearizing it in an approximation of the angular velocity at the end point ($\omega_{end}=0$), and the mean value of the angular velocity over the overtravel path is assumed to be the mean (in this case $\omega^- = \omega/2$). Furthermore it is necessary to distinguish between clamping and releasing, since during release the clamping force decreases with the distance traveled; if the shut-off process lasts longer, co$^-$ is lower.

The remaining time is determined with equation (1-5). Here the acceleration signal is again differentiated to determine the jerk. "Jerk" in a vehicle is understood to mean, for example, the current change in acceleration.

$$t_{rest} = (a_{soll} - a_{ist})/(da/dt) \quad (1\text{-}5)$$

FIG. 3 shows the flow chart for calculating the shut-off point. To determine the remaining time $t_{rest}$, the determined values of actual acceleration $a_{ist}$, target acceleration $a_{soll}$ and the derivation of the differentiated acceleration signal da/dt are combined by means of mathematical operations in accordance with the above-mentioned formulas. The overtravel time $t_{nachlauf}$ is likewise calculated from the determined values $F_{klemm}$ and the angular velocity $\omega$. The determination is made, in turn, by drawing upon the above-mentioned formulas and transformations while taking into account the other stated values, such as the efficiency of the locking brake $\eta_{MoC}$ or the moment of inertia J.

Figure 4:
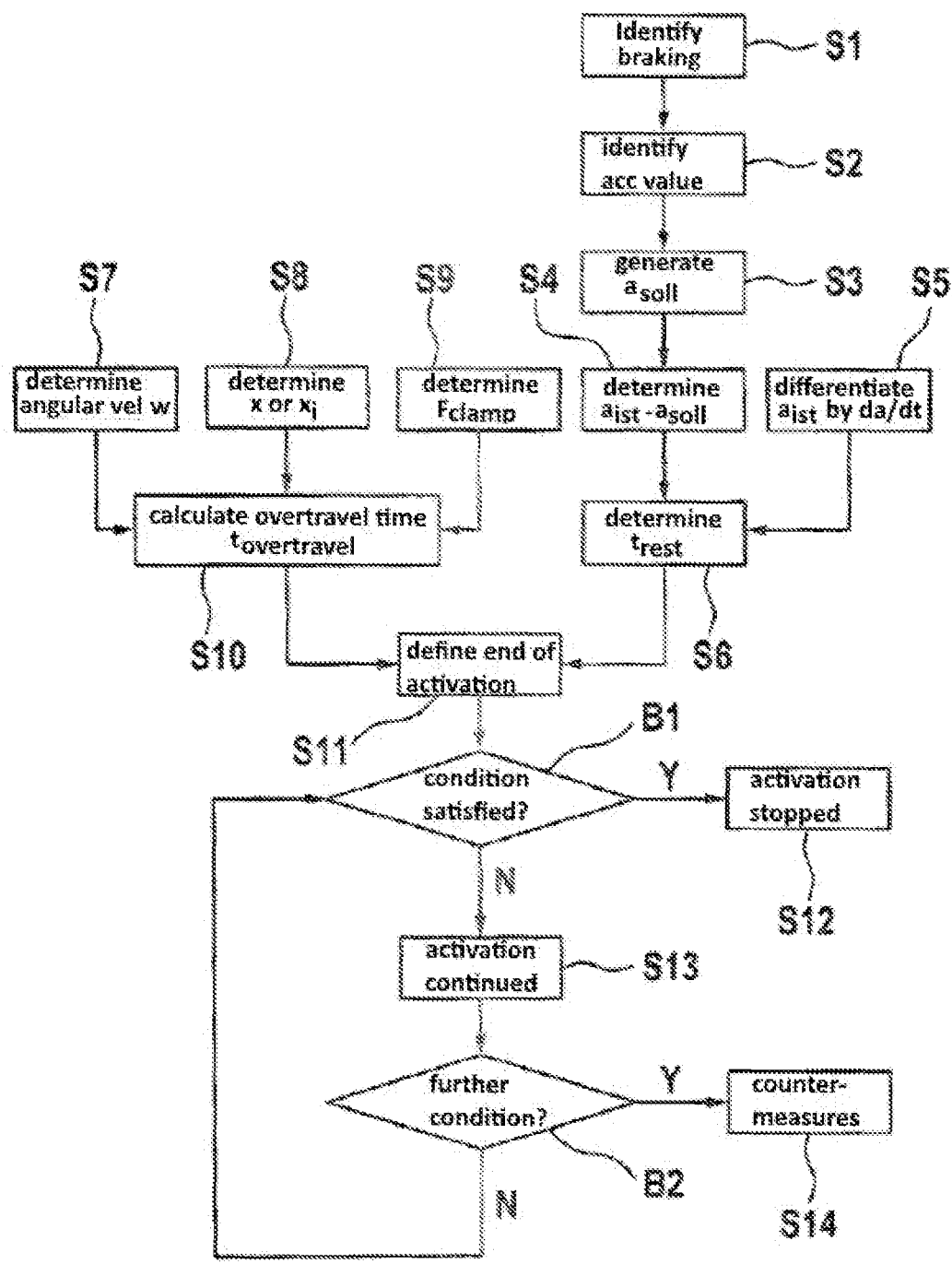
FIG. 4 a schematic representation of a flow chart containing the relevant process steps.

FIG. 4 shows a representation of the method steps of an embodiment of the disclosure. Here, the identification of a driver's desire to brake occurs in a first step S1. In a step S2, an acceleration value corresponding to the driver's desire to brake is identified. The generation of a value $a_{soll}$ for the locking brake occurs in step S3. In step S4, the difference between the actual acceleration $a_{ist}$ and the target acceleration $a_{soll}$ is formed. In step S5, the actual acceleration $a_{ist}$ is differentiated by the jerk da/dt of the vehicle. From these values, the remaining time t the locking brake process is determined in step S6. In a step S7, the current angular velocity $\omega$ of the actuator of the locking brake is determined. Likewise, the currently traveled clamping distance x or $x_i$—is determined in step S8, and the clamping force $F_{klemm}$ is determined in step S9. From these values, the overtravel time $t_{nachlauf}$ is calculated in step S10 in accordance with equations 1-4. In step S11, the condition for ending the activation is defined, as is described in equation 1-1. Within the scope of B1, it is verified whether the condition has been satisfied. If this is the case (Y), then the activation of the locking brake is stopped in step S12. If this is not the case (N), then it is verified within the scope of B2 whether a further condition has been satisfied; in this case, whether the wheels are locked. If this is the case (Y), then countermeasures are introduced in step S14. If this is not the case (N), then it is again verified whether the first condition B1 has been satisfied in the meantime.

What is claimed is:

1. A method for operating an automated locking brake in a vehicle, comprising:
    setting a defined deceleration of the vehicle with the automated locking brake during a locking brake process;
    shutting off activation of the automated locking brake when a shut-off condition has been satisfied; and
    taking into account at least one predicted value of the locking brake process in the shut-off condition,
    wherein the predicted value of the locking brake process includes an overtravel time of the locking brake process in the shut-off condition, and
    further comprising:
        taking into account a comparison of the overtravel time and the remaining time of the locking brake process in the shut-off condition; and
        shutting off activation of the automated locking brake when the overtravel time and the remaining time are equal.

2. The method according to claim 1, further comprising: taking into account a remaining time of the locking brake process in the shut-off condition.

3. The method according to claim 2, further comprising: determining the remaining time of the locking brake process based on an acceleration of the vehicle.

4. The method according to claim 2, further comprising: determining the remaining time of the locking brake process based on an actual deceleration of the vehicle and a target deceleration of the vehicle.

5. The method according to claim 2, further comprising: determining the remaining time of the locking brake process based on a progress over time of a deceleration of the vehicle.

6. The method according to claim 1, further comprising: determining a remaining time of the locking brake process based on a change in a deceleration of the vehicle.

7. The method according to claim 1, further comprising: taking into account at least one of a current angular velocity, a current clamping distance, and a current clamping force in determining the overtravel time.

8. A device configured to carry out a method of operating an automated locking brake in a motor vehicle, the device comprising:
    a processor configured to:
        set a defined deceleration of the vehicle with the automated locking brake during a locking brake process;
        shut off activation of the automated locking brake when a shut-off condition has been satisfied; and
        take into account at least one predicted value of the locking brake process in the shut-off condition, wherein the predicted value of the locking brake process includes an overtravel time of the locking brake process in the shut-off condition;
        take into account a comparison of the overtravel time and the remaining time of the locking brake process in the shut-off condition; and
        shut off activation of the automated locking brake when the overtravel time and the remaining time are equal.

9. A computer program stored on a non-transitory computer readable storage medium and configured to be executed by a processor and cause the processor to:
    set a defined deceleration of the vehicle with the automated locking brake during a locking brake process;
    shut off activation of the automated locking brake when a shut-off condition has been satisfied; and
    take into account at least one predicted value of the locking brake process in the shut-off condition, wherein the predicted value of the locking brake process includes an overtravel time of the locking brake process in the shut-off condition;
    take into account a comparison of the overtravel time and the remaining time of the locking brake process in the shut-off condition; and
    shut off activation of the automated locking brake when the overtravel time and the remaining time are equal.

* * * * *